(12) United States Patent
Martin

(10) Patent No.: US 6,396,875 B1
(45) Date of Patent: May 28, 2002

(54) METHOD OF SWITCHING OF CODED VIDEO SEQUENCES AND CORRESPONDING DEVICE

(75) Inventor: François Martin, Paris (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/241,016

(22) Filed: Feb. 1, 1999

(30) Foreign Application Priority Data

Feb. 3, 1998 (EP) .............................. 98400224

(51) Int. Cl.$^7$ ................................. H04N 7/18
(52) U.S. Cl. .............................. 375/240.25; 375/240.07
(58) Field of Search ................ 375/240.01–240.29; 348/845.1–845.3

(56) References Cited

U.S. PATENT DOCUMENTS 5,534,944 A * 7/1996 Egawa et al. ............... 348/584
6,154,496 A * 11/2000 Radha ..................... 375/240.28
6,208,691 B1 * 3/2001 Balakrishnan et al. . 375/240.12
6,229,851 B1 * 5/2001 Cotton .................... 375/240.25

OTHER PUBLICATIONS

"MPEG video coding: a basic tutorial introduction", by S.R. Ely, BBC report RD 1996/3.

* cited by examiner

Primary Examiner—Andy Rao
(74) Attorney, Agent, or Firm—Russell Gross

(57) ABSTRACT

The invention relates to a method of switching from a first to a second coded video sequence when the bitrate of the second one is higher than the bitrate of the first one, and to a corresponding device. If the addition of the bits respectively associated to the last transmitted picture (02) of the first sequence and to the first transmitted picture (N1) of the second sequence gives at the decoding time of (02) a number greater than the size of the decoder's buffer, then the bitrate of the second sequence is increased with respect to the higher bitrate.

2 Claims, 4 Drawing Sheets

METHOD OF SWITCHING OF CODED VIDEO SEQUENCES AND CORRESPONDING DEVICE

The present invention relates to a method of switching, before decoding, from a first coded video sequence at a bitrate Rold to a second one at a higher bitrate Rnew, and to a corresponding device for implementing said method.

As described for instance in the document "MPEG video coding: a basic tutorial introduction", BBC report RD 1996/3, an MPEG-type compressed video sequence is subdivided into groups of pictures (or GOPs) that are themselves including different types of coded pictures (an example of GOP is described in FIG. 1):

intra-coded pictures (I-pictures), that are coded without any reference to other pictures;

predictive-coded pictures (P-pictures), that are coded using prediction from past reference;

bidirectionally predictive-coded pictures (B-pictures), that are coded using prediction from past and/or future reference(s).

According to the different types of prediction, pictures are coded with more or less efficiency, and the resulting number of bits is not constant. Moreover, as a picture is supposed, according to the MPEG specifications, to be instantaneously decoded every frame period Tv, the first bit of the coded pictures does not spend the same time in the decoder's buffer: this variable time, defined in the MPEG syntax, is called the vbv_delay (vbv=video buffering verifier). An example of decoder's buffer fullness for a stream coded at a constant bitrate and where a picture is instantaneously decoded every frame period Tv is shown in FIG. 2 (decoder's buffer fullness versus time) for successive pictures I0 to I4 with respective vbv_delays vbv(I0), vbv(I1), ..., vbv(I4), ..., etc. The bitrate for a picture is given by the slope, and the fullness (or decoder's buffer state) is given by the highest point for each period Tv. According to FIG. 3, the size d(Ij) of a picture Ij decoded at time td(Ij) is equal to:

$$d(Ij) = S-(Ij) - S+(Ij) \quad (1)$$

with S−(Ij) and S+(Ij) designating respectively the decoder's buffer state at time $t_d^-(Ij)1$(=the time just before the picture Ij is removed from decoder's buffer) and at time $t_d^+(Ij)2$(= the time just after the picture Ij is removed from decoder's buffer). For this picture Ij, the relation between its vbv_delay vbv(Ij), the bitrate R of the video stream and the decoder's buffer state S−(Ij) is given by:

$$S-(Ij) = vbv(Ij).R \quad (2)$$

One has also:

$$S+(Ij) = S-(Ij+1) - R.Tv \quad (3)$$

From relations (2), (1), (3), it can be deduced a more precise relation giving the size d(Ij) of the decoded picture Ij:

$$d(Ij) = R.(vbv(Ij) - vbv(Ij+1) + Tv) \quad (4)$$

Due to this regulation model, a simple switch between two compressed (coded) video sequences is not always possible. Generally, the bitrates Rold and Rnew of the old and new video sequences are indeed different. So, when a switching point is crossing the decoder's buffer, the input rate entering said buffer is different from the one that would have entered in absence of switching. As explained in relation with FIGS. 4 and 5, a problem of buffer may then occur during the transition period when pictures of the old sequence are decoded and in the same time pictures of the new sequence enter the decoder's buffer: there is a risk of overflow when the input rate becomes greater than the previous one.

FIG. 4 shows indeed simultaneously some pictures of the old video sequence (the last transmitted pictures 01, 02 and the first replaced picture 03 of said sequence) and the two first transmitted pictures N1, N2 of the new one. Each picture being, as already said, decoded every period Tv, the vbv_delay vbv(N1) of the first transmitted picture N1 of the new sequence gives the time tsw of the switching (in FIG. 4, said vbv_delay is at most equal to the vbv_delay vbv(03) of the first replaced picture 03: the switching is not at all possible if it is not the case, since these vbv_delays vbv(N1) and vbv(03) would not be compatible). As then illustrated in FIG. 5 that shows the resulting stream in the decoder's buffer, the first bits of N1 are entering said buffer when the bits of 02 are still entering this buffer and before 02 is decoded. As the bitrate Rnew is greater than the old one Rold, this situation leads, in FIG. 5, to an overflow, Smax designating the maximum size of the decoder's buffer state as defined by the relation (2) (it may be noted here that a problem of underflow is not possible since there are always bits of a picture of the old sequence or of the new one in the decoder's buffer).

An object of the invention is therefore to propose an original method to avoid buffer overflow.

To this end the invention relates to a method such as described in the opening paragraph of the description and which is characterized in that it comprises the steps of:

comparing to the maximum size of the decoder's buffer state the total number of bits given by the addition of the bits associated to the last transmitted picture (02) of the first sequence and the first transmitted picture (N1) of the second sequence and entering the decoder's buffer between said time tsw and the decoding time of said last transmitted picture (02);

if said number is higher than said maximum size, increasing the bitrate of said second sequence with respect to the bitrate Rnew for at least its first transmitted picture, at least up to a value Rint for which said total number is correspondingly reduced to a value at most equal to said maximum size.

It is known, in MPEG-2 standard, that video switching is facilitated by the use of special access points called "splicing points". Switch can be performed only if same splicing points are present on both new and old video sequences. According to the present invention, in spite of the fact that the bitrate of the new sequence is already greater than the bitrate of the old one, this new bitrate is further (but temporarily) increased in such a manner that the bits of the first transmitted picture N1 of the new sequence need less time to enter the decoder's buffer. So the first bit of said picture may enter later said buffer, and the addition of the bits of the last transmitted old picture 02 and the bits of the first transmitted new picture N1, that are at least partially in the buffer during the same period Tv, then leads to a lower value, sufficient to avoid overflow if the bitrate has been sufficiently increased. The switching operation is now possible without any overflow problem, and without using any splicing point in order to facilitate it.

The particularities and advantages of the invention will now be apparent from the following description and the accompanying drawings, in which:

FIG. 1 shows an example of GOP including different types of coded pictures;

FIG. 2 gives an example of decoder's buffer fullness for a stream coded at a constant bitrate and where a picture is instantaneously decoded at regular times;

FIG. 3 allows to identify the main useful parameters of a picture Ij when using the decoder's buffer fullness representation;

Figure 4:
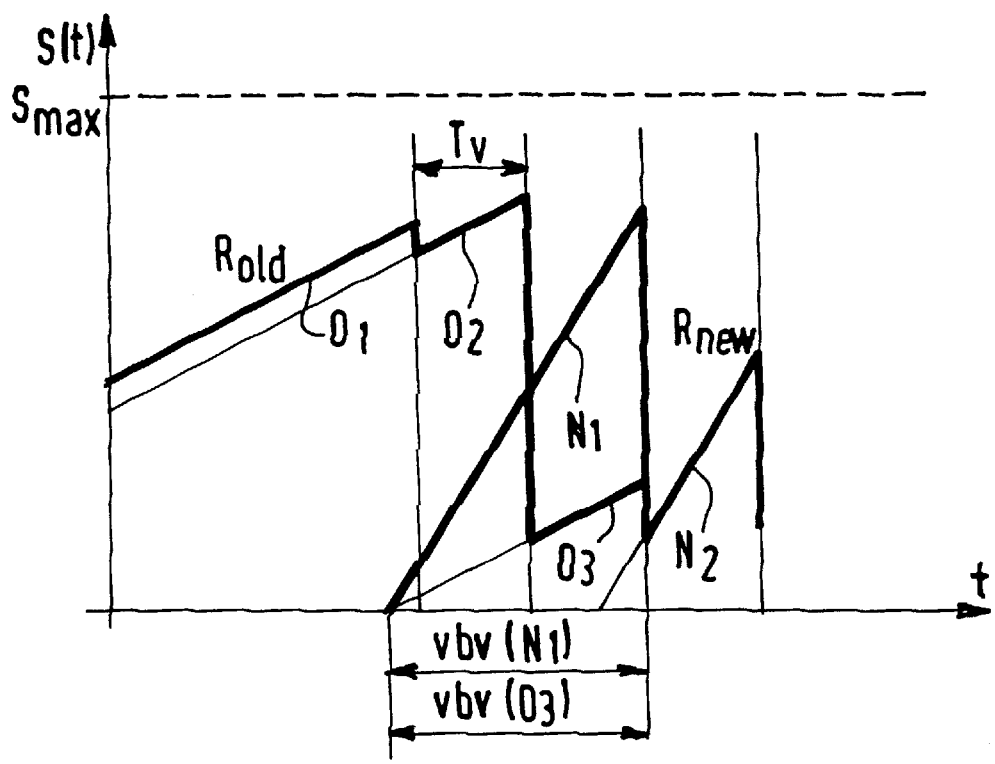
FIGS. 4 and 5 illustrate a situation wherein a switch between an old and a new sequence would lead to an overflow and is therefore not possible.
Figure 5:
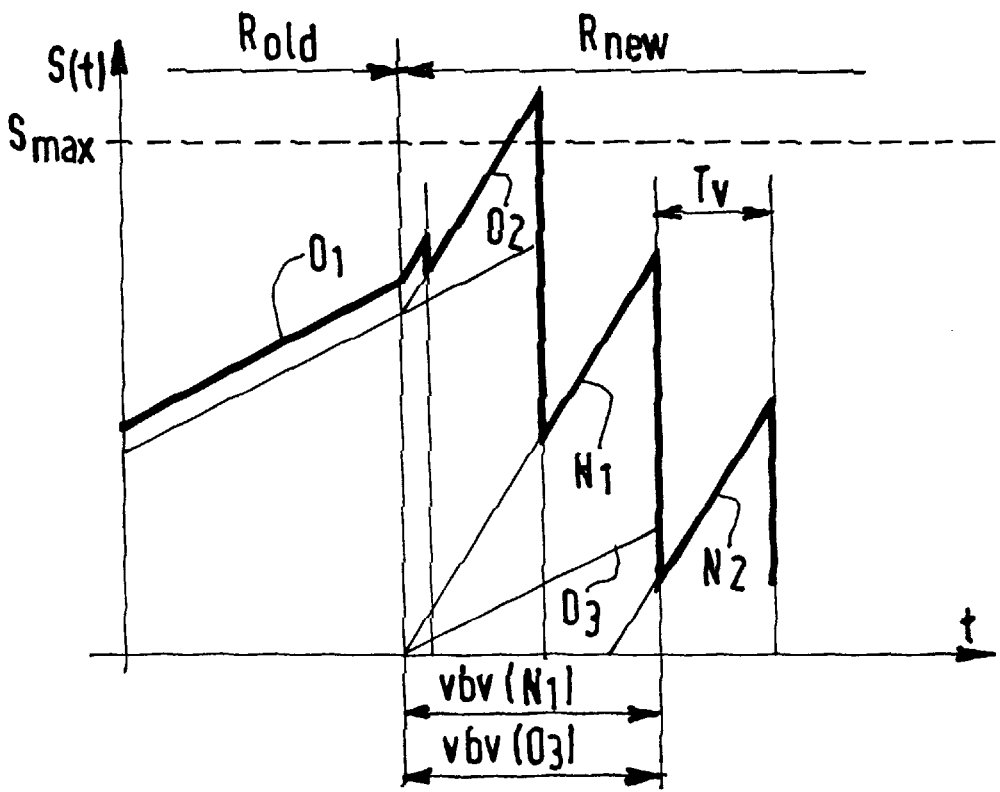
Figure 6:
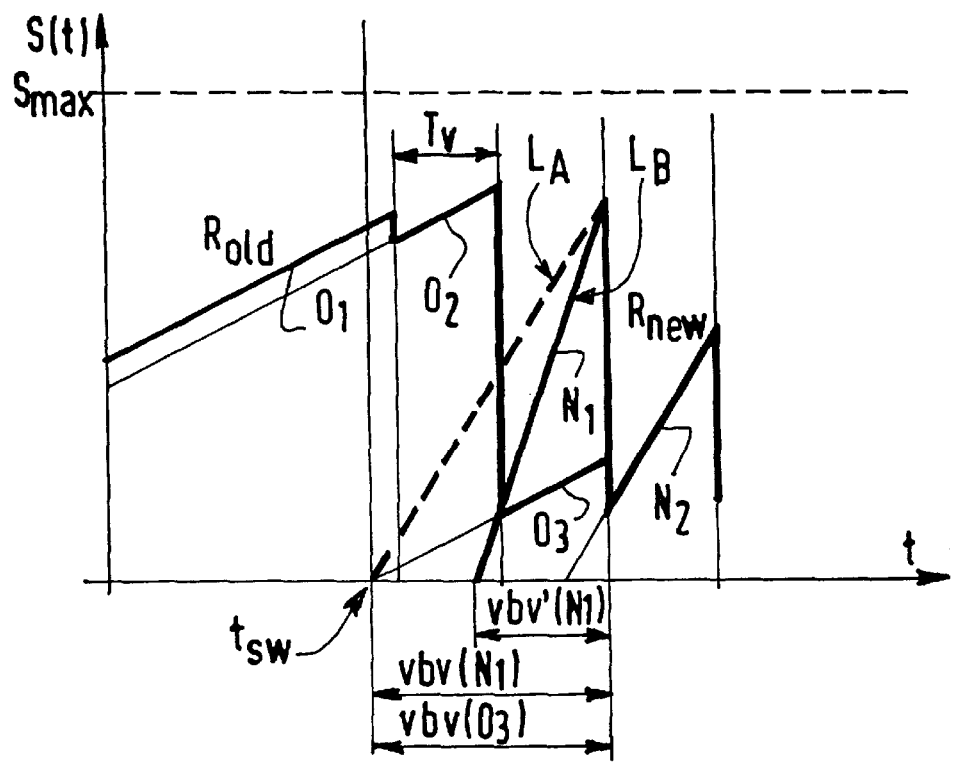
FIG. 6 illustrates the principle of the method according to the invention.

This principle is explained in a detailed manner in relation with FIG. 6 (to be compared to FIG. 4). As can be seen in that figure, an intermediate bitrate Rint is applied to the stream corresponding to the first transmitted picture N1. The dotted line LA, corresponding to the situation previously illustrated in FIG. 4, now comes to a second position LB corresponding to an increased value of the bitrate in comparison with the new bitrate Rnew.

Figure 7:
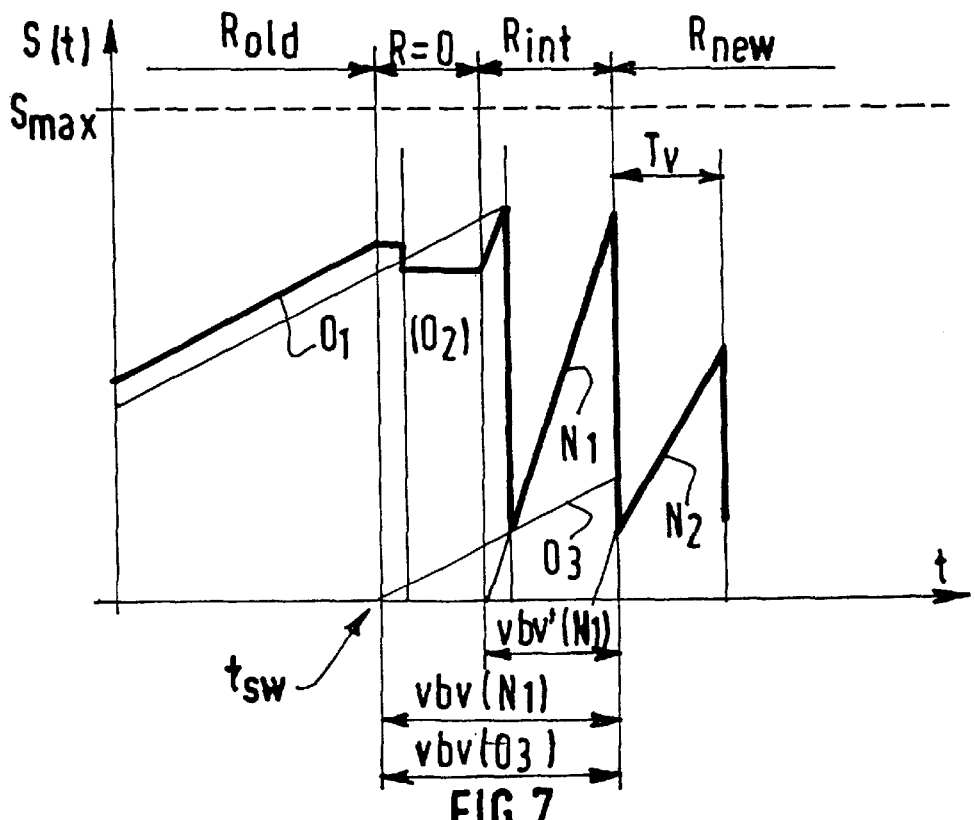
FIG. 7 shows the resulting stream (i.e. the global decoder's buffer evolution) if the switch is made according to the principle of the invention.

As seen in FIG. 7, when the switch is requested, i.e. at the time tsw, no bits of the picture N1 enter the decoder's buffer during a small period corresponding to the difference between the vbv_delay vbv(03) associated to the first replaced picture 03 of the old sequence at the old bitrate Rold and the reduced vbv_delay vbv'(N1) associated for the first inserted picture N1 to the increased bitrate Rint. It must indeed be recalled that the decoding operations of the pictures are supposed to be done instantaneously at regularly spaced times (the decoding period being Tv) that constitute reference times (the decoder's buffer is emptied at these times), which explains why the first bit of the first transmitted new picture N1 may enter later the decoder's buffer when the principle of the invention is implemented.

It appears therefore that less bits enter the decoder's buffer after the time tsw, and that the duration of this situation is sufficient for reducing the decoder's buffer state to a value lower than the maximum size of this buffer state, and therefore for preventing from any overflow. Considering further FIG. 7, it can be seen that the successive situations are now the following:

(a) the bits of the old sequence (01, 02) enter the decoder's buffer at the bitrate Rold, up to the time tsw when the switch is requested;

(b) from tsw to the next decoding time (at said decoding time, the coded picture 01 is decoded) and from said decoding time of 01 to the time at which the first bit of N1 enters the decoder's buffer, bits of the old sequence are no longer entering the buffer (the bitrate is equal to 0);

(c) the first bits of the new picture N1 enter the decoder's buffer at the intermediate bitrate Rint;

(d) at the end of the current period Tv, the picture called 02 is decoded;

(e) during the following period Tv, all the residual bits of N1 enter the decoder's buffer, always at the bitrate Rint;

(f) at the end of said period Tv, the picture N1 is decoded, and the intermediate period opened at the time tsw comes to its end;

(g) the bits of the following new picture N2 now enter the decoder's buffer at the new bitrate Rnew, which is lower than the intermediate bitrate Rint.

The invention is not limited to the implementation described above, from which modifications can be deduced without departing from the scope of the invention. For instance, if the computed minimal rate Rm that guarantees no overflow is greater than the highest possible bitrate according to the maximum bandwidth available, it is nevertheless possible to increase the bitrate up to this maximum bitrate and then to combine the present implementation of the invention with another solution to avoid the possible residual overflow.

Such other solution may be for instance the insertion of so-called minimal pictures, as described in the european patent application 97401160.3 (PHF97557) previously filed by the applicant on May 27, 1997. Said patent application also relates to a method of switching from a first to a second video sequence, but according to which the bitrate is now kept constant. Instead, the new video sequence (the second one) is delayed of k frame periods Tv, and this delay creates for the decoder a lack of pictures which is then used for inserting an additional sequence of k pictures, that are minimal in order to empty the decoder's buffer as soon as possible.

These pictures are called minimal since they are coded with a number of bits as low as possible while staying compliant with the decoding process. A way to constitute a sequence of k minimal pictures is to consider a sequence of uniform colour pictures where all the pixels (picture elements) are identical. This type of sequence can be coded for instance with a first intra-coded picture (I-picture) containing macroblocks of the same colour and (k−1) predictive-coded pictures (P-pictures) in which only the first and the last macroblocks of each slice are encoded with null forward vectors and no error prediction (the other ones being said skipped macroblocks).

Figure 1:
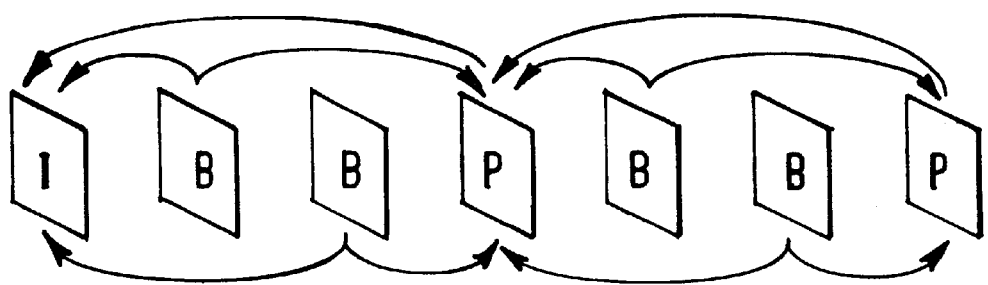
Figure 2:
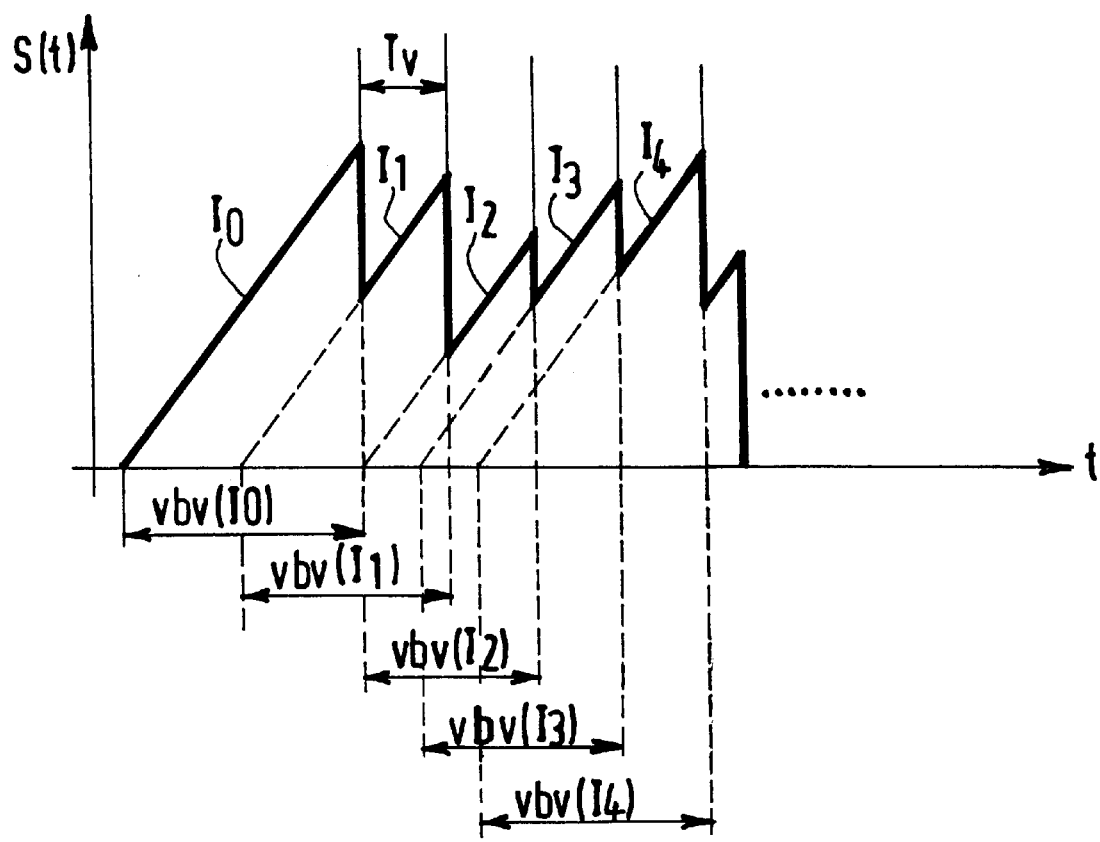
Figure 3:
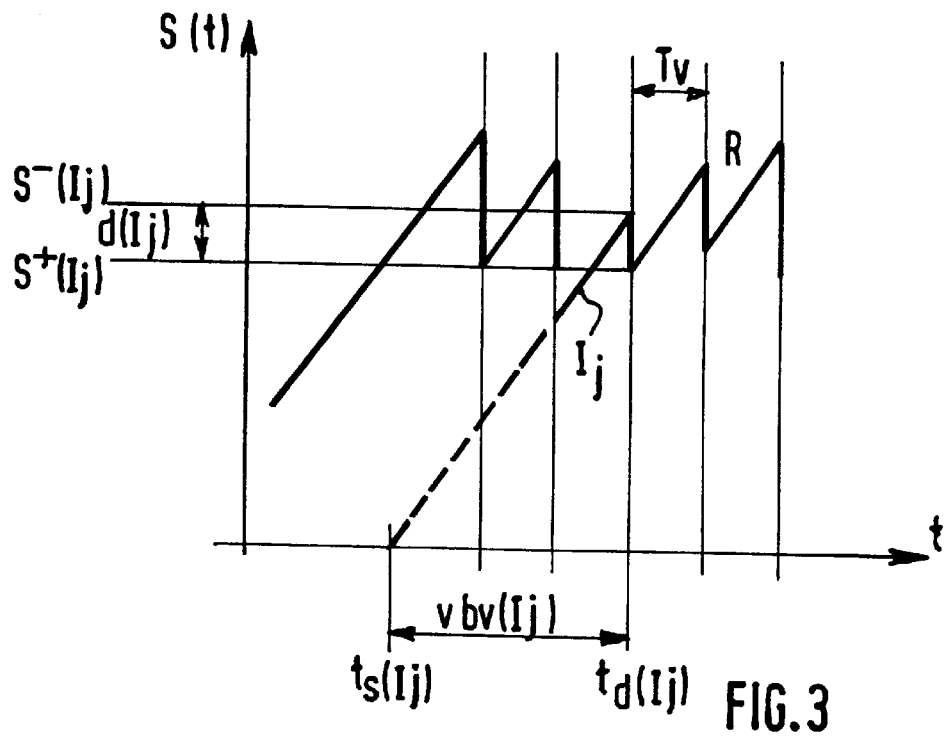
Figure 8:
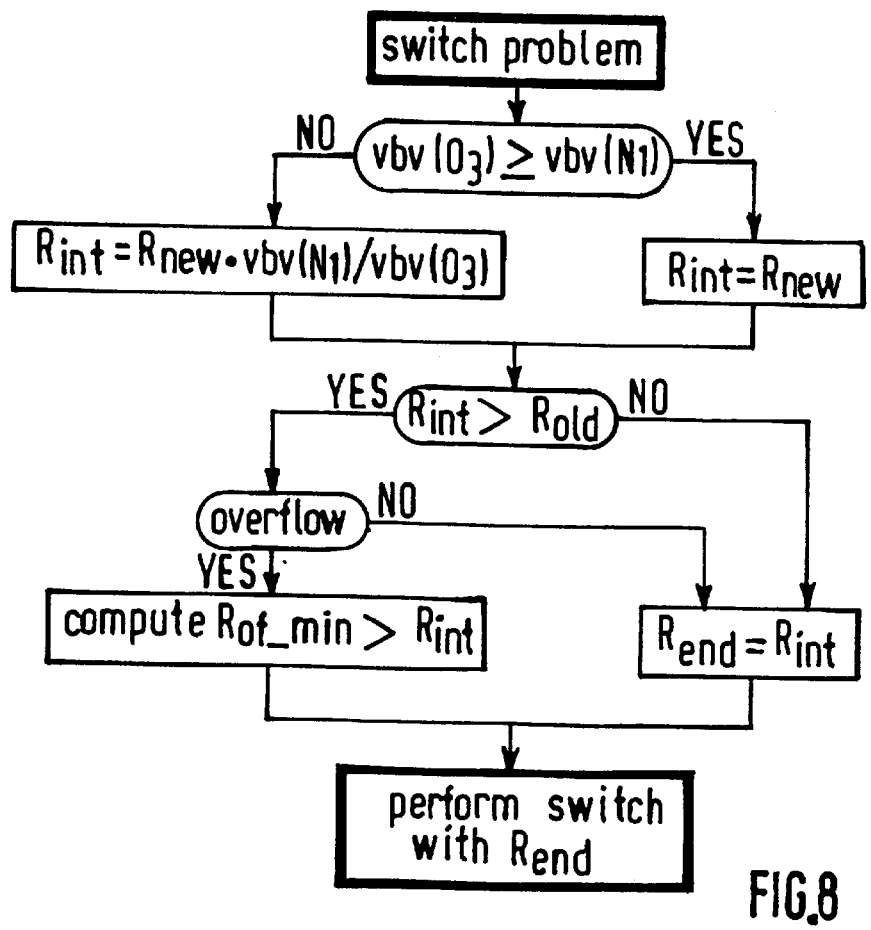
FIG. 8 illustrates a switching device for implementing the described method.

Moreover, the invention also relates to a device for implementing the switching method described in relation with FIG. 6, and the diagram of FIG. 8 illustrates the main steps of this implementation that have to be provided for performing a switch according to said method of local bitrate modification.

What is claimed is:

1. A method of switching at a time tsw, before decoding, from a first coded video sequence at a bitrate Rold to a second one at a higher bitrate Rnew, characterized in that it comprises the steps of:

comparing to the maximum size of the decoder's buffer state the total number of bits given by the addition of the bits associated to the last transmitted picture (02) of the first sequence and the first transmitted picture (N1) of the second sequence entering the decoder's buffer between said time tsw and the decoding time of said last transmitted picture (02);

if said number is higher than said maximum size, increasing the bitrate of said second sequence with respect to the bitrate Rnew for at least its first transmitted picture, at least up to a value Rint for which said total number is correspondingly reduced to a value at most equal to said maximum size.

2. A method according to claim 1, characterized in that the minimal possible value of Rint corresponds to the situation wherein the sum of the decoder's buffer states at the respective times $t_d^-(0_2)$ and $t_d^+(0_2)$ just before and just after the picture (02) is removed from said buffer is equal to said maximum size.

* * * * *